(12) United States Patent  
Seeger et al.

(10) Patent No.: US 7,734,560 B2  
(45) Date of Patent: Jun. 8, 2010

(54) LOOSE COUPLING OF PATTERN COMPONENTS WITH INTERFACE REGENERATION AND PROPAGATION

(75) Inventors: Frank Seeger, Wiesloch (DE); Markus Cherdron, Muehlhausen (DE); Holger Koser, Schoenborn (DE); Ulf Fildebrandt, Oftersheim (DE); Markus Muenkel, Hockenheim (DE); Jade Sripad, Bangalore (IN)

(73) Assignee: SAP AG, Walldorf (DE)

( * ) Notice: Subject to any disclaimer, the term of this patent is extended or adjusted under 35 U.S.C. 154(b) by 287 days.

(21) Appl. No.: 11/509,517

(22) Filed: Aug. 23, 2006

(65) Prior Publication Data

US 2008/0222073 A1  Sep. 11, 2008

(51) Int. Cl.
G06F 10/00 (2006.01)
G06N 5/02 (2006.01)
G06F 9/44 (2006.01)

(52) U.S. Cl. .................. 706/48; 717/107
(58) Field of Classification Search ............ 706/48; 717/107
See application file for complete search history.

(56) References Cited

U.S. PATENT DOCUMENTS

2006/0168577 A1* 7/2006 Melo et al. ................ 717/168

OTHER PUBLICATIONS

Morel, B and Alexander, P "Spartacas: Automating Component Reuse and Adaptation", IEEE Transaction on Software Engineering, vol. 30, No. 9, 2004, pp. 587-600.*

* cited by examiner

Primary Examiner—David R Vincent
Assistant Examiner—Li-Wu Chang
(74) Attorney, Agent, or Firm—Mintz, Levin, Cohn, Ferris, Glovsky & Popeo, P.C.

(57) ABSTRACT

A computer-implemented method, system, and computer program product for generating an application is disclosed. A pattern module associated with an application pattern is provided. The pattern module includes a model of the application pattern, a design time component to provide content for the model, and a runtime component to execute the operation associated with the model based with the content. A set of dependencies among the model, the design time component, and the runtime component is determined. A set of interfaces is then generated to couple the model, the design time component, and the runtime component based on the set of dependencies.

15 Claims, 4 Drawing Sheets

LOOSE COUPLING OF PATTERN COMPONENTS WITH INTERFACE REGENERATION AND PROPAGATION

BACKGROUND

This document relates to data processing by digital computer in a visual modeling language environment, and more particularly to generating a pattern-based application in a visual modeling environment.

Application programs, sometimes referred to simply as applications, are programs that an end-user runs to accomplish certain tasks. Applications typically work in conjunction with one or more back-end systems, which store the data to be worked on (e.g., business objects and other business data), as well as logic for manipulating the data (e.g., transactions or other business logic). Examples of back-end systems include database systems, enterprise resource planning (ERP) systems, and customer relationship management (CRM) systems. A user interface (UI) is designed to work in concert with application programs, and facilitates interaction between humans and computers by inviting and responding to user input.

Traditional techniques for creating applications involved extensive programming using a specific and complex programming language, which could only be done by an expert of such programming language. New, visual modeling tools such as the Visual Composer tool by SAP AG of Walldorf Germany simplify the creation and management of applications by providing graphical patterns that can connected together to automatically generate code represented by the graphical patterns. However, even visual modeling tools make it difficult to manage, modify, and propagate modifications to applications that are created and run on multiple client systems.

SUMMARY

This document discloses a computer-implemented method, system and computer program product for loosely coupling components of an application pattern to enable extensions, recombinations, modifications, etc., of the application pattern and implemented applications based on the application pattern.

In some aspects, a computer-implemented method of generating an application, and a computer program product tangibly embodied in an information carrier to execute the method, includes providing a pattern module associated with an application pattern. The pattern module includes a model of the application pattern, a design time component to provide content for the model, and a runtime component to execute the operation associated with the model based with the content. The method further includes determining a set of dependencies among the model, the design time component, and the runtime component, and generating a set of interfaces to couple the model, the design time component, and the runtime component based on the set of dependencies.

In another aspect, a system for generating an application includes an application pattern having one or more pattern modules. Each pattern module includes a model of an operation of the application, a design time component to provide content for the model, a runtime component to execute the operation associated with the model based with the content, and a set of interfaces to couple the model, design time component, and runtime component based on dependencies therein. The set of interfaces are also adapted to couple two or more pattern modules. Accordingly, extensions, modifications, recombinations, etc., of an application pattern are possible at the pattern module level.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
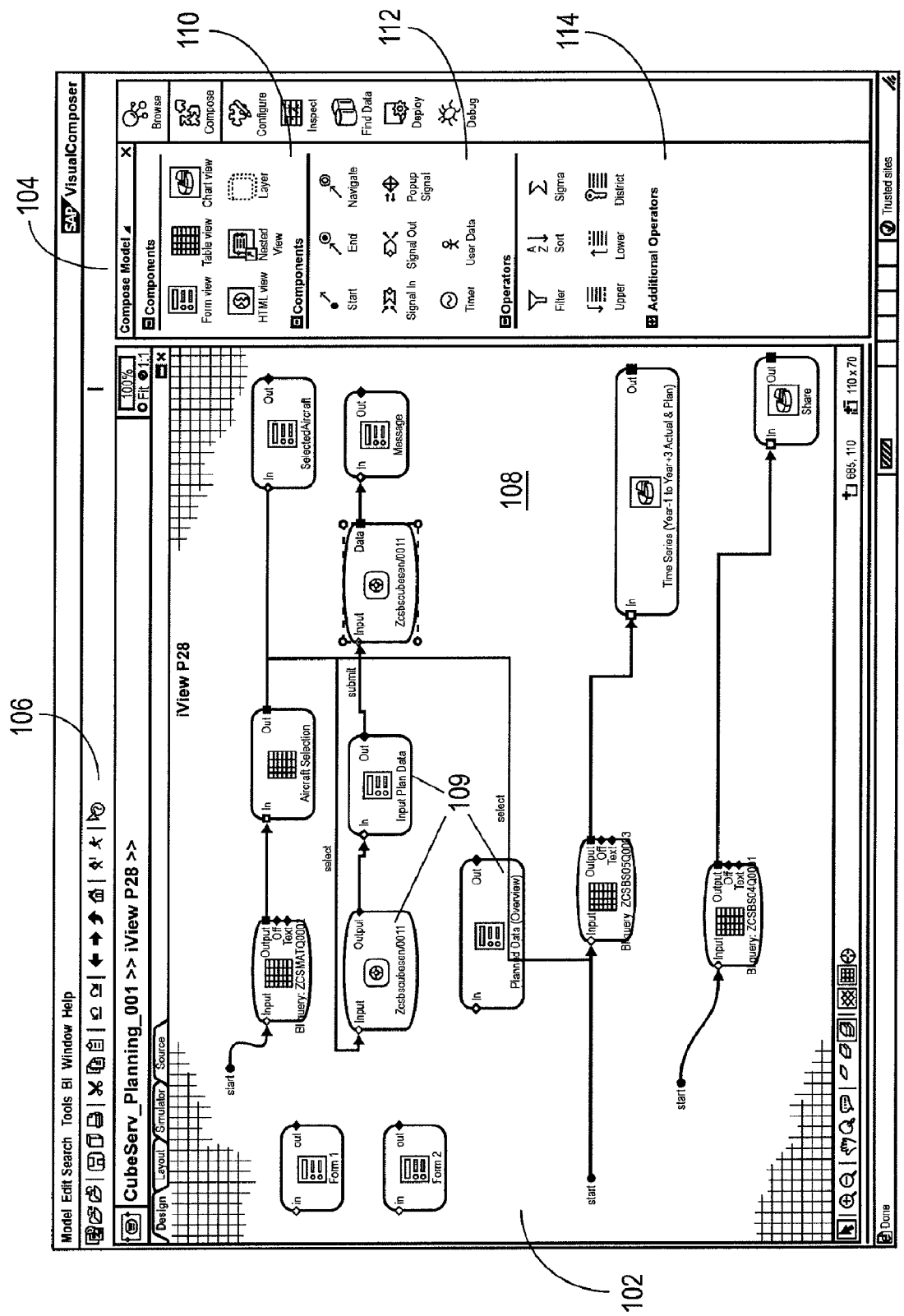
FIG. 1 is a screen shot of a visual modeling tool according to an embodiment.

FIG. 1 is a screen shot of a visual modeling tool 100 for code-free creation of composite applications. The visual modeling tool 100 is platform-independent, as well as independent of any technology or programming language. The visual modeling tool 100 is preferably a web-based, rich-client presentation layer application in a client/server computer architecture. The visual modeling tool 100 includes a visual representation window 102, also known as a "storyboard," a palette 104 of selectable logic elements, and at least one control interface 106 such as a control or command bar. The visual representation window 102 displays a graphical representation of an application 108, or portion thereof.

The application 108 includes application logic and process flows as represented by a number of application objects 109. Each application object 109 can represent a functional step in a logical process or a data flow, and include one or more inputs and one or more outputs. Each application object 109 acts as a model for the execution, testing, simulation, debugging and document creation related to the application 108. A view of the visual modeling tool 100 can be configured to show only a high-level functional view of the application 108 and hide the details, however the view can be adjusted, particularly within each application object 109, so that increasing levels of detail (to the code level) can be viewed in the visual representation window 102.

The selectable logic elements displayed in the palette 104 can include interactors 110 that modify the view of the visual representation window 102, flow control objects 112 that provide a directive of data flow, and data operators 114 that define an operation to be executed on data within each application object 106. The selectable logic elements can be "dragged" from the palette and "dropped" into the visual representation window 102. The visual modeling tool 100 can also include property editors, design assistants, drawing tools, an interaction manager, and a code generator that generates code based on the high-level functional view of the application 108.

The application 108 can be formed, or composed, by establishing relationships 104 between the application objects 109, and to generate a graphical representation of the application 108. The visual modeling tool 100 provides modifiability (composition, decomposition, and recomposition) of an application 108 through visual programming. The graphical representation of the application 108 leads to automatic code generation. Once modeled in the storyboard, an application 108 can be run everywhere irrespective of platform or programming language. Variations can be made to a modeled application 108, while usability and portability is preserved. Changes to the model can be recomputed by the visual modeling tool 100, and propagated to as many versions of an application 108 as desired. In an exemplary embodiment, a composed application is associated with a unique uniform resource locator (URL) that can be accessed by any client computer using any browser, for runtime execution of the application 108.

Figure 2:
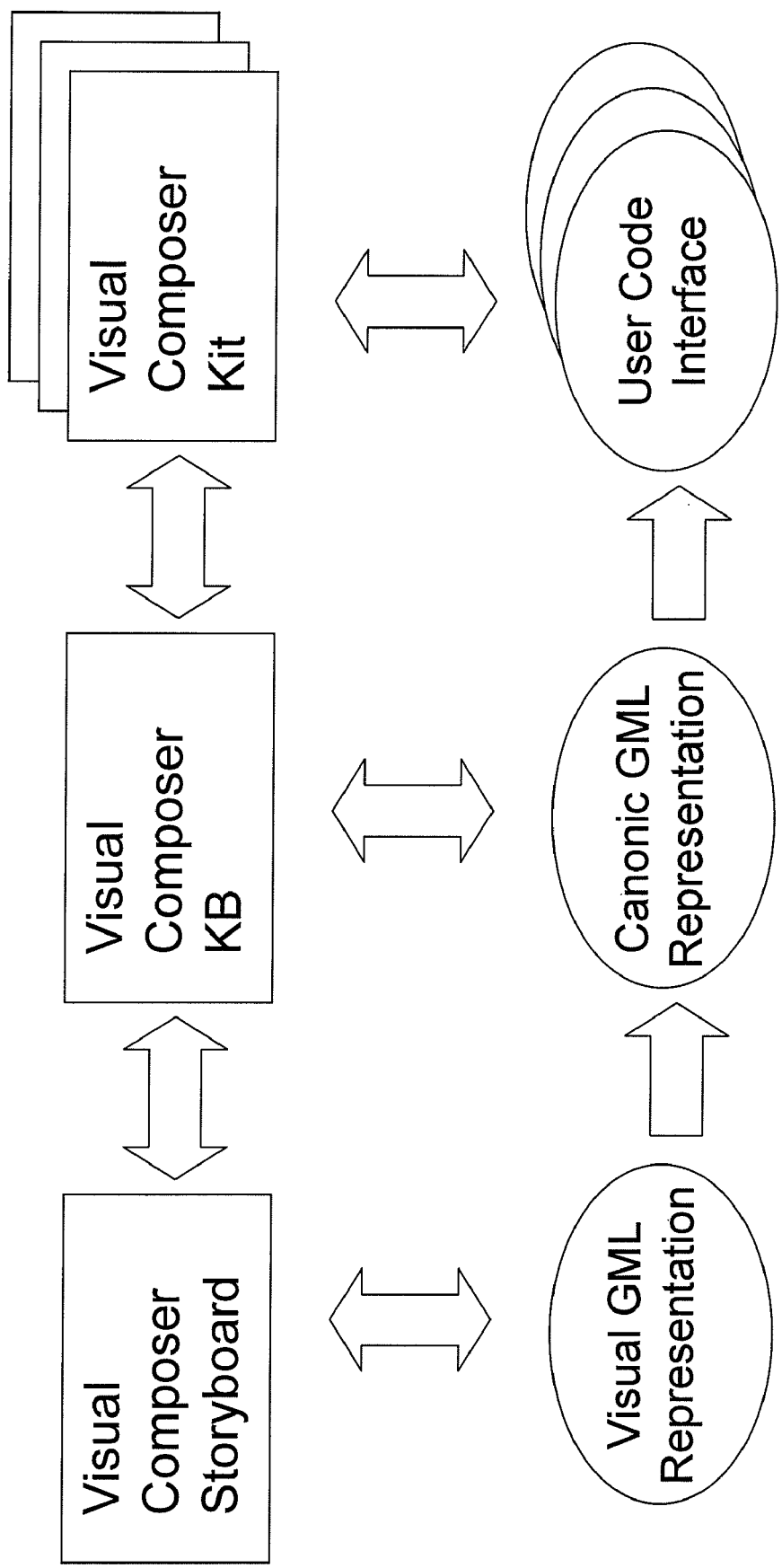
FIG. 2 illustrates the operation of a storyboard of a visual modeling tool that is used to draw and compose model diagrams.

In an exemplary embodiment, the visual modeling tool 100 is similar to the Visual Composer Modeling System developed by SAP AG of Walldorf Germany, as part of their Netweaver platform for business intelligence and analytics. The visual modeling tool 100 can utilize a visual modeling language, such as the GUI Machine Modeling Language (GML) to implement the storyboard. As illustrated in FIG. 2, the storyboard is used to draw and compose model diagrams using a simple and intuitive visual notation, and user interactions such as "drag and drop" operations of application objects. The model is stored in a knowledge base using a machine-readable modeling language, and a number of pre-built graphical modeling kits enable automatic code generation without any programming by a developer.

Figure 3:
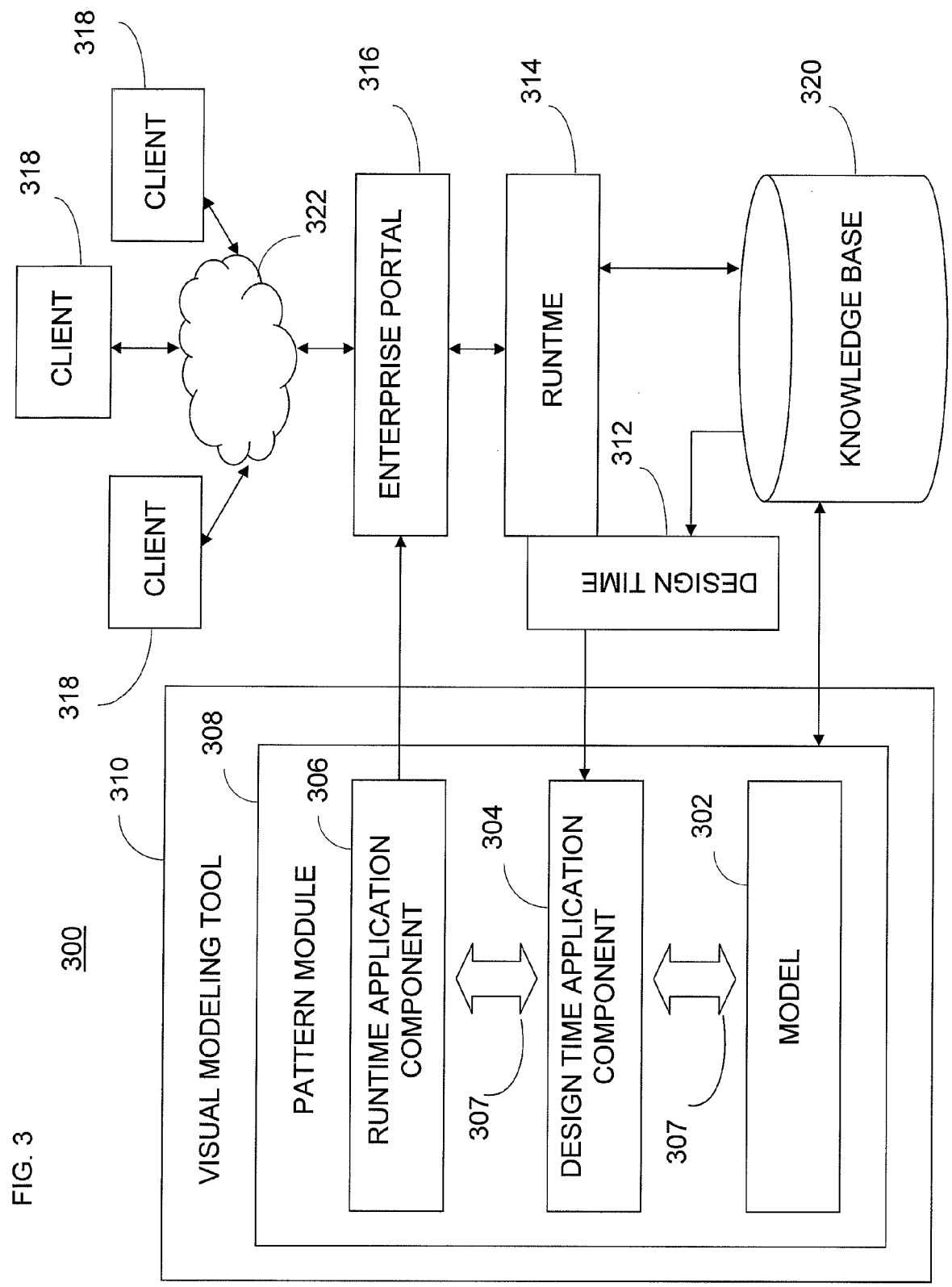
FIG. 3 illustrates a model-driven architecture of an application generation system.

FIG. 3 illustrates a model-driven architecture of an application generation system 300, in which models 302 are used by a virtual modeling tool 310 to generate code and as a baseline configuration for future modifications. In some embodiments of a model-driven architecture, an application consists a model 302, a design time component 304 to provide content for the model, and a runtime component 306 to execute the model 302 with the content provided by the design time component 304.

The model 302 represents the basic functional and operational data flow and layout of an application, i.e. an application pattern that can be centrally defined and delivered to an enterprise for customization. The design time component 304 includes data content, user interface logic of the application specified by the model 302. The design time component 304 uses data content from a knowledge base 320 (e.g. database, infocube, etc.) accessed through a design time application and connectivity module 312. The runtime component 306 is a platform-independent execution engine that runs the logic of the application specified in the design time component 304. The runtime component 306 executes the application and data content from the knowledge base 320 through a runtime application and connectivity module 314. The design time application and connectivity module 312 and runtime application and connectivity module 314 can run in a server arrangement.

As shown in FIG. 3, the parts of a pattern module 308 (model 302, design time application component 304, and runtime application component 306) are loosely coupled by interfaces 307. Each interface 307 is an abstract definition of a dependency or set of dependencies between two or more parts. The model 302, design time component 304 and runtime component 306 can be coupled together by the interfaces 307 to form a pattern module 308.

The pattern module 308 is an executable file that can be stored in a knowledge base as a single unitary object. Accordingly, if changes need to be made to the model 302, each component of the pattern module 308 need not be decomposed; rather, the changes are propagated throughout the design time component 304 and the runtime component 306 as well. The pattern module 308 can also be exported via an enterprise portal 316 and delivered to client systems 318 via a communications network 322, such as the Internet, to include a wireless communication network, broadband communication network, or other interactive communication medium.

Each composition of the model 302, design time component 304 and runtime component 306 can be used to compose an overall model, design time application, and runtime application for a web-based application system. Accordingly, the pattern module 308 simplifies modifications to, distribution (e.g. portability), and execution of applications created using a visual modeling tool.

Figure 4:
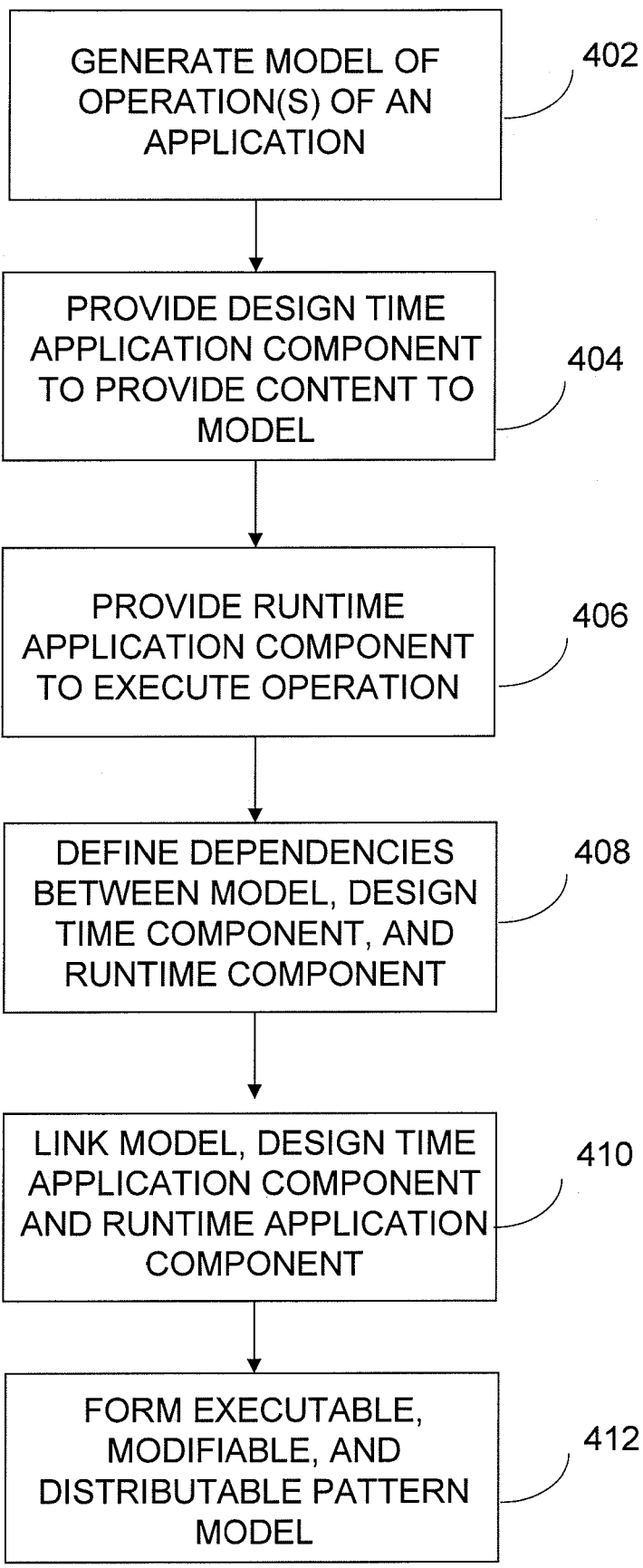
FIG. 4 is a flowchart of a method 400 for creating a pattern-based application.

FIG. 4 is a flowchart of a method 400 for creating a pattern-based application. At 402, a model of one or more operations of an application is generated. The model represents a high-level abstraction of a pattern, which can be all or a portion of the application. At 404, a design time component is provided to supply content to the model. At 406, a runtime component is provided to execute the model based on the content supplied by the design time component.

At 408, one or more dependencies are determined between the model, the design time component, and the runtime component. At 410, the model, the design time component, and the runtime component are loosely coupled by interfaces that are generated based on the dependencies to form a pattern module, at 410. The interfaces are abstract definitions of the dependencies, and can be easily regenerated if the dependencies are changed, such as if, for example, a modification is made to an application pattern during design time. The pattern module can be distributed and executed among heterogeneous client systems within an enterprise, yet modifiable at the design source such that modifications are easily propagated throughout the pattern module.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to knowledge base architectures that include a relational database; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed is:

1. A computer-implemented method comprising:

generating, in a visual modeling tool displayed in a storyboard of a graphical user interface, a model that defines a functional and operational data flow and a layout of an application using an application pattern, the visual modeling tool being implemented on one or more processors;

executing, in the visual modeling tool, a design time component and a runtime component, the design time component comprising data content and user interface logic of the application, the data content being accessed from a knowledge base via a design time application and connectivity module, the runtime component comprising a platform independent execution engine that runs the user interface logic of the application, the runtime component executing the application and the data content from the knowledge base through a runtime application and connectivity module;

determining a plurality of dependencies among the model, the design time component, and the runtime component;

forming, in the visual modeling tool, a pattern module comprising an executable file that comprises the model, the design time component, and the runtime component, the forming of the pattern module comprising generating a plurality of interfaces that couple the model, the design time component, and the runtime component based on the plurality of dependencies, the plurality of interfaces comprising abstract definitions of the plurality of dependencies that are readily regenerated upon changes to the plurality of dependencies, the runtime component interfacing the design time component using one of the plurality of interfaces, the design time component interfacing the model using another one of the plurality of interfaces;

distributing, by the visual modeling tool, a copy of the pattern module to one or more client systems within an enterprise for execution on the one or more client systems;

receiving a modification to the application pattern of the model, the modification causing a regeneration of the set of interfaces; and automatically propagating the modification to the design time component and the runtime component in the executable file of the pattern module without requiring decomposition of the executable file of the pattern module.

2. A method in accordance with claim 1, further comprising executing the application according to the pattern module.

3. A method in accordance with claim 1, further comprising storing the pattern module in the knowledge base.

4. A method in accordance with claim 1, further comprising composing an overall model, overall design time application, and overall run time application of the operation based on the pattern module.

5. A method in accordance with claim 1, wherein the copy of the pattern module is distributed to the one or more client systems via an enterprise portal.

6. A method in accordance with claim 5, further comprising propagating the modification, via the enterprise portal, to each copy of the pattern module at the one or more client systems.

7. A computer program product, stored in a storage device, the computer program product being operable to cause a data processing apparatus to perform operations comprising:

generating, in a visual modeling tool displayed in a storyboard of a graphical user interface, a model that defines a functional and operational data flow and a layout of an application using an application pattern;

executing, in the visual modeling tool, a design time component and a runtime component, the design time component comprising data content and user interface logic of the application, the data content being accessed from a knowledge base via a design time application and connectivity module, the runtime component comprising a platform independent execution engine that runs the user interface logic of the application, the runtime component executing the application and the data content from the knowledge base through a runtime application and connectivity module;

determining a plurality of dependencies among the model, the design time component, and the runtime component;

forming, in the visual modeling tool, a pattern module comprising an executable file that comprises the model, the design time component, and the runtime component, the forming of the pattern module comprising a plurality of interfaces that couple the model, the design time component, and the runtime component based on the plurality of dependencies, the plurality of interfaces comprising abstract definitions of the plurality of dependencies that are readily regenerated upon changes to the plurality of dependencies, the runtime component interfacing the design time component using one of the plurality of interfaces, the design time component interfacing the model using another one of the plurality of interfaces;

distributing, by the visual modeling tool, a copy of the pattern module to one or more client systems within an enterprise for execution on the one or mote client systems;

receiving a modification to the application pattern of the model, the modification causing a regeneration of the set of interfaces; and automatically propagating the modification to the design time component and the runtime component in the executable file of the pattern module without requiring decomposition of the executable file of the pattern module.

8. A computer program product in accordance with claim 7, wherein the operations further comprise executing the application according to the pattern module.

9. A computer program product in accordance with claim 7, wherein the operations further comprise storing the pattern module in the knowledge base.

10. A computer program product in accordance with claim 7, wherein the copy of the application pattern is distributed to one or more client systems via an enterprise portal.

11. A computer program product in accordance with claim 10, wherein the operations further comprise propagating the modification, via the enterprise portal, to each copy of the pattern module at the one or more client systems.

12. A system comprising.

a processor; and a memory, the processor and the memory configured to provide a method comprising:

generating, in a visual modeling tool displayed in a storyboard of a graphical user interface, a model that defines a functional and operational data flow and a layout of an application using an application pattern;

executing, in the visual modeling tool, a design time component and a runtime component, the design time component comprising data content and user interface logic of the application, the data content being accessed from a knowledge base via a design time application and connectivity module, the runtime component comprising a platform independent execution engine that runs the user interface logic of the application, the runtime component executing the application and the data content from the knowledge base through a runtime application and connectivity module;

determining a plurality of dependencies among the model, the design time component, and the runtime component;

forming, in the visual modeling tool, a pattern module comprising an executable file that comprises the model, the design time component, and the runtime component, the forming of the pattern module comprising generating a plurality of interfaces that couple the model, the design time component, and the runtime component based on the plurality of dependencies, the plurality of interfaces comprising abstract definitions of the plurality of dependencies that are readily regenerated upon changes to the plurality of dependencies, the runtime component interfacing the design time component using one of the plurality of interfaces, the design time component interfacing the model using another one of the plurality of interfaces;

distributing, by the visual modeling tool, a copy of the pattern module to one or more client systems within an enterprise for execution on the one or more client systems;

receiving a modification to the application pattern of the model, the modification causing a regeneration of the set of interfaces; and automatically propagating the modification to the design time component and the runtime component in the executable file of the pattern module without requiring decomposition of the executable file of the pattern module.

13. A system in accordance with claim 12, further comprising the knowledge base, the knowledge base storing the pattern module in addition to the data content for the model.

14. A system in accordance with claim 12, further comprising an enterprise portal to provide distribution of each copy of the pattern module to the one or more client systems.

15. A system in accordance with claim 14, wherein each of the one or more client systems is connected to the enterprise portal via a communications network.

* * * * *